United States Patent [19]

Bethel

[11] Patent Number: 4,965,956
[45] Date of Patent: * Oct. 30, 1990

[54] CAM ACTION FISHING SINKER DEVICE

[76] Inventor: Bob J. Bethel, 308 Triangle Ranch Rd., Trinidad, Tex. 75163

[*] Notice: The portion of the term of this patent subsequent to Jun. 13, 2006 has been disclaimed.

[21] Appl. No.: 349,105

[22] Filed: May 8, 1989

Related U.S. Application Data

[63] Continuation-in-part of Ser. No. 114,513, Oct. 30, 1987, Pat. No. 4,837,966.

[51] Int. Cl.$^5$ .............................................. A01K 95/00
[52] U.S. Cl. ...................... 43/43.1; 43/44.9; 43/42.13
[58] Field of Search ............... 43/43.1, 43.15, 44.81, 43/44.9, 44.87, 44.97, 42.26, 42.28, 42.13

[56] References Cited

U.S. PATENT DOCUMENTS

| | | | |
|---|---|---|---|
| 2,140,724 | 12/1938 | Stefan | 43/54.1 |
| 4,453,334 | 6/1984 | Opperman et al. | 43/42.13 |
| 4,638,586 | 1/1987 | Hall | 43/42.26 |
| 4,837,966 | 6/1986 | Bethal | 43/43.1 |

Primary Examiner—Richard K. Seidel
Assistant Examiner—James Miner
Attorney, Agent, or Firm—Ronald B. Sefrna

[57] ABSTRACT

The invention comprises an improved fishing sinker device which includes an elongate flattened body having a central longitudinal aperture to slideably receive a fishing line therethrough, and a slot-like aperture at one end of the body of the sinker to receive and releaseably retain the eye and shaft of a fishing hook used in conjunction with the sinker device of the invention. The elongate flattened configuration of the preferred embodiment of the sinker device provides a cam action to properly position a fishing hook retained in the slot-like aperture of the sinker for setting the point of the hook in the mouth of a fish, and the retention of the hook within the slot-like aperture of the sinker will be released upon attempts by a fish to throw the hook, removing the weight of the sinker from the hook and reducing the probability of withdrawal of the hook from the mouth of the fish. A first alternative embodiment of the sinker device of the invention, in which the body and the hook aperture are radially symmetrical, and a second alternative embodiment, in which the invention further includes a spinner bait lure form, are additionally provided.

19 Claims, 1 Drawing Sheet

CAM ACTION FISHING SINKER DEVICE

This is a continuation-in-part of Ser. No. 07/114,513, filed Oct. 30, 1987, now U.S. Pat. No. 4,837,966, issued June 13, 1989.

BACKGROUND OF THE INVENTION

The general use of sinker devices in fishing with hook and line has been practiced for many years, and it has become increasingly common to employ specialized sinker designs in certain specific fishing situations. One such situation is the use of plastic or natural worms as bait with a fishing technique known as jigging, in which a sinker device is placed in proximity to the baited hook and used to sink the baited hook to the bottom of the body of water being fished. In this fishing technique it is desirable to maintain a particular orientation between sinker and hook, and combined sinker and hook devices sometimes referred to as jig heads have been employed to positively maintain that orientation. Although jig heads, exemplified by designs offered for sale through the 1986 "Bass Pro Shops" catalogue, and other sinker designs which firmly attach the sInker to the fishing hook or to the fishing line in immediate proximity to the hook, are effective in maintaining the desired orientation of the hook and bait above the bottom of the body of water, they suffer from several disadvantages. One such disadvantage is the fact that the sinker or sinker portion of the jig head will often wedge open the mouth of a fish which has taken the baited hook, allowing the hook to slide from the mouth of the fish when the fisherman attempts to set it. Another disadvantage is the inability to release the relatively heavy sinker from the hook after setting of the hook in the mouth of the fish, with the result that the sinker portion adds momentum and leverage to the efforts of the fish to throw or dislodge the hook from its mouth.

One approach to the solution of these disadvantages which has been attempted is to provide a sinker which slides freely along the fishing line, as illustrated by U.S. Pat. No. 3,803,749 to Boyum and by U.S. Pat. No. 4,649,663 to Strickland. While these designs have been effective in eliminating the hook throwing leverage of a fixed sinker, their effectiveness in preventing the wedging open of the mouth of the fish is much less evident. In addition, neither design is particularly useful in positioning the hook within the mouth of the fish to aid in the setting of the hook by the fisherman.

It is an object of the present invention to provide a sinker device which not only overcomes the disadvantages of wedging and hook throwing leverage, but also to provide a sinker design which aids in properly positioning the hook within the mouth of the fish for successfully setting such hook. It is a further object of the invention to provide an embodiment of the sinker device having an integral spinner bait form useful for attracting fish to the bait.

FIELD OF THE INVENTION

The present invention generally relates to fishing sinker devices, and, in its preferred embodiment, more specifically relates to sliding sinker devices adapted to be releaseably interconnected to a fishing hook and configured to provide a cam action for positioning the hook within the mouth of a fish for most effective setting of such hook. The present invention further specifically relates, in one of its embodiments, to sliding sinker devices having an integral spinner bait form for the purpose of attracting fish.

SUMMARY OF THE INVENTION

The present invention provides a fishing sinker device comprising an elongate body having a central longitudinal aperture to slideably receive a fishing line therethrough, and a coaxial hook aperture extending into said body from one end thereof to receive the eye and a part of the shaft of a fishing hook attached to such fishing line. In the preferred embodiment, the device of the invention is constructed of lead or a soft lead alloy to provide suitable weight without excessive size. The hook aperture of the sinker device is lined with a resilient rubber or rubber-like material to releasably retain the eye of the fishing hook within the hook aperture while substantially reducing abrasion of the fishing line attached to the hook.

In the preferred embodiment the body of the sinker device is formed in a wedge-like configuration in which the width of the body gradually increases from a slightly rounded point at a first end to a maximum value at a second end of the sinker, and the thickness of the body Increases from a point at such first end to a maximum value intermediate the two ends and remains essentially constant over the majority of the length of the sinker to its second end. The body of the sinker device may, however, be formed in a more nearly cylindrical, or bullet-shaped configuration, narrowing to a point at its first end, as an alternative embodiment.

The degree of retention on the eye of the hook within the hook aperture of the sinker device is such that the interconnection will be released when a fish is hooked and begins efforts to throw the hook from its mouth, allowing the sinker device to slide freely along the fishing line and eliminating the tendency of a firmly interconnected sinker to pull the hook from the mouth of the fish.

The sinker device of the invention is readily adaptable to use as a spinner bait lure rig, with the alternative addition of a spinner bait form to the structure of the device. In the alternative spinner bait lure embodiment, a V-shaped spinner form is interconnected to the first end of the sinker device by attachment of one end of one leg of the V-shaped form to that first end adjacent to the opening of the longitudinal aperture at that first end. The spinner form includes an eye at the point of the "v" to receive fishing line therethrough, and typically further includes a conventional spinner tab interconnected to the end of the other leg of the V-shaped form through a swivel so as to allow free rotation of the spinner tab. The sinker device as used with the spinner balt rig may also be provided with a fringed skirt surrounding the body of the sinker intermediate its two ends, for the dual purpose of attracting fish and protecting the hook against entanglement.

In use, a fishing line is inserted fully through the central longitudinal aperture and the hook aperture of the sinker from its first end, and a fishing hook is attached to the fishing line. The sinker device is then slid along the fishing line toward the hook and the eye and a part of the shaft of the hook are inserted into the hook aperture of the resilient insert disposed within the aperture extending into the body of the sinker from its second end. With the alternative spinner bait embodiment, the fishing line is first inserted through the eye of the V-shaped form and then through the coaxially aligned apertures of the body of the sinker device The frictional retentIon of the eye of the hook within the hook aperture will be maintained until a fish is hooked and begins efforts to throw the hook from its mouth, whereupon the releaseable interconnection is broken and the sinker is released from the hook, eliminating the contribution of the weight of the sinker to the efforts of the fish to throw the hook.

DETAILED DESCRIPTION OF THE INVENTION

Figure 1:
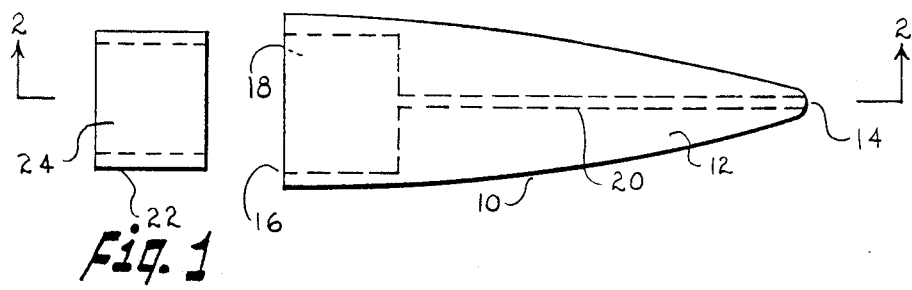
FIG. 1 is an exploded view of the preferred embodiment of the sinker device of the invention.
Figure 2:
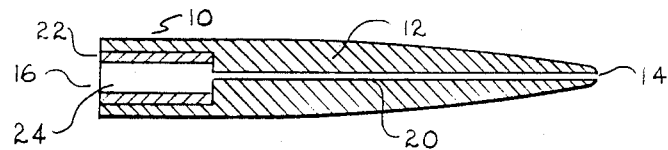
FIG. 2 is a cross-sectional elevation view of the preferred embodiment of the sinker device of the invention along line 2—2 of FIG. 1.

Referring now to the accompanying drawing figures, especially FIG. 1 and FIG. 2, the preferred embodiment of the sinker device of the invention, identified by reference number 10, comprises an elongate flattened unitary body 12, of generally wedge-shaped configuration, having a central longitudinal axis. The width of body 12 of sinker 10 increases gradually from a point at a first end 14 to a maximum value at a second end 16 of body 12. The thickness of body 12 is substantially constant over the majority of the length of body 12 from second end 16 toward first end 14, and then tapers to a point at first end 14. The elongate poInted configuration of body 12 is useful in avoiding snagging of sinker 10 in weeds or other underwater obstructions, and the principal advantage of the preferred flattening of body 12 to a wedge-like configuration is the creation of a cam action in the mouth of a fish during the efforts of a fisherman to set the associated hook therein, described below.

In the preferred embodiment, sinker 10 further includes a slot-like aperture 18 extending into the interior of body 12 from its second end 16, with the longitudinal axis of aperture 18 in alignment with the longitudinal axis of body 12. Aperture 18 remains essentially constant in both height and width from second end 16 toward the interior of body 12. Body 12 is additionally penetrated by a narrow central aperture 20, extending in coaxial alignment with the longitudinal axis of body 12 from first end 14 to connect with aperture lB for the purpose of receiving a fishing line to be passed through sinker 10 and tied to the eye of the fishing hook to be used therewith. The end of central aperture 20 coincident with first end 14 of body 12 is preferably slightly flared and smooth to avoid abrasion of the fishing line extending therethrough.

Aperture 18 is fitted with a resilient insert 22 of rubber or rubber-like material to aid in the retention of the eye and shaft of a fishing hook therein while reducing abrasion of the fishing line tied to the eye of the fishing hook. Insert 22 is configured to mate wIth and be firmly interconnected within aperture 18. Insert 22 includes aperture 24 extending into the interior thereof and through the inner end thereof in communication and coaxial alignment with central aperture 20 so as to allow the extension of fishing line fully through sinker 10 and to receive the eye and part of the shaft of the fishing hook to be inserted into aperture 24 from the second end of body 12. In the preferred embodiment of sinker 10 the height of aperture 24 perpendicular to the plane of body 12 should be less than the largest cross-sectional dimension of the eye of the fishing hook to be used with sinker 10, to aid in the positioning of the eye of the fishing hook therein. Apertures 18, 20, and 24, all in coaxial alignment with the longitudinal axis of body 12, form a continuous passageway through the interior of sinker 10. Although in the preferred embodiment of sinker 10 both apertures 18 and 24 are formed with a slot-like configuration, it will be understood that aperture 18 may be formed with any convenient cross-sectional configuration, with the configuration of insert 22 adapted accordingly, so long as aperture 24 is formed with a slot-like configuration and properly oriented with respect to the plane of body 12.

It will be understood that body 12 of sinker 10 may be formed in a generally cylindrical configuration, narrowing to a slightly rounded point at first end 14, if desired, as an alternative embodiment. If such alternative configuration is utilized, body 12 of sinker 10 will not function as a cam for positioning the hook in the mouth of a fish, but the advantages associated with the releaseable retention of the eye of the hook within aperture 24 of resilient insert 22 will be retained, eliminating any contribution of the sinker to the effectiveness of efforts of a hooked fish to throw the hook. In such an alternative embodiment, aperture 18 extending into second end 16 of body 12 should be generally symmetrical about the longitudinal axis of body 12, configured wIth a cylindrical or conic section shape, and aperture 24 of resilient insert 22 is similarly symmetrical), and of appropriate dimension to receive the eye of a fishing hook and frictionally retain such eye in the interior of aperture 24 by compression of the resilient material of insert 22.

In the preferred and alternative embodiments of the sinker device of the invention, body 12 is preferably formed of lead or of a lead alloy in order to provide suitable weight to sinker 10 without excessive volume. Body 12 may, however, be formed of other metallic material, or of a non-metallic material, having suitable properties for use of sinker 10 as described. Body 12 of sinker 10 may also be painted or coated with a resilient or non-resilient coating, if desired, without departing from the scope of the invention.

Figure 3:
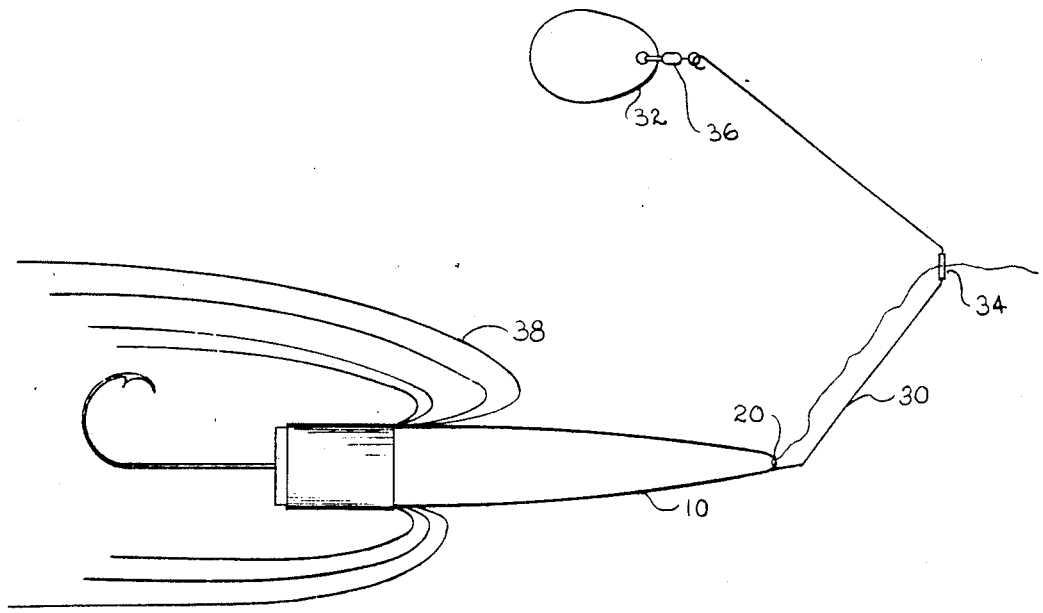
FIG. 3 is a side elevation of the alternative spinner bait lure embodiment of the sinker device of the invention.
Figure 4:
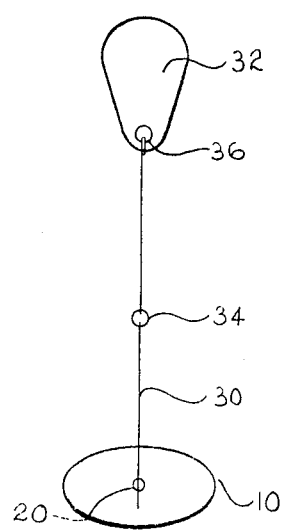
FIG. 4 is a front elevation view of the alternative spinner bait lure embodiment of the sinker device of the invention.

Sinker 10, in either the preferred embodiment or the alternative embodiment described immediately above is readily adaptable for use as a spinner bait lure with the addition of a spinner bait form and spinner tab, as another alternative embodiment of the basic invention In such an alternative embodiment, depicted in FIG. 3 and FIG. 4, the sinker device of the invention is modified for use as a spinner bait lure by interconnection of a one-piece, V-shaped, spinner form 30 to body 12 of sinker 10 at first end 14. Spinner form 30 comprises a elongate wIre, In the shape of a "V", interconnected to body 12 of sinker 10 at the outer end of a first leg of the "V", having a spinner tab 32 rotatably interconnected to the outer end of the opposite, second, leg of the "v", and having an eye 34 formed at the midpoint of the "V" to receive fishing line therethrough. In the preferred embodiment, spinner tab 32 is attached to spinner form 30 by means of a barrel swivel 36 pivotally interconnected to spinner form 30 at the outer end of the second leg of the "V" and pivotally interconnected to spinner tab 32, thereby allowing spinner tab 32 essentially unrestricted freedom of movement relative to spinner form 30. Eye 34 is disposed with the plane of eye 34 perpendicular to the plane of spinner form 30, to facilitate the passage of fishing line therethrough without constriction or binding. Eye 34 is preferably formed by bending the wire material of construction of spinner form 30 into an appropriately oriented loop, although eye 34 may comprise a discrete eyelet component interconnected to spinner form 30 by conventional means.

The spinner form 30 is preferably interconnected to sinker device 10 by forming body 12 around the outer end of the first leg of the "v" of spinner form 30 during construction thereof, with said second leg extending into body 12 from its first end 14 at a point just below central aperture 20. However, the interconnection may be formed after construction of sinker 10 by and convenient means suitable to form a rigid interconnection with the longitudinal axis of sinker 10 substantially parallel to the axIs of eye 34. A skirt 38, made of a flexible rubber or rubber-like material, is preferably provided, attached to body 12 of sinker 10 intermediate its two ends.

In using the sinker device of the invention, described in terms of the preferred embodiment, in which body 12 is flattened, a fishing line is inserted through apertures 20 and 24 of body 12 and insert 22 from first end 14 and attached to the eye of a fishing hook to be used with sinker 10. Sinker 10 is then said along such fishing line until the eye and a part of the shaft of the fishing hook are fully received within aperture 24. When so interconnected, the plane o±the curvature of the fishing hook will be perpendicular to the plane of body 12 of sinker 10. The fishing hook is baited, and the interconnected sinker and baited hook are placed into the water. In use of the alternative spinner bait lure embodiment with the preferred flattened embodiment of body 12 the steps for rigging the lure are the same as described above, except that the fishing line is first inserted through eye 34 of spinner form 30 prior to its insertion through apertures 20 and 24. If the alternative cylindrical embodiment of sinker device 10 is utilized, with or without the alternative spinner form, the steps of rigging the device differ only in that the orientation of the plane of the hook is not inherently fixed relative to other components, since aperture 24 of insert 22 is radially symmetrical.

When the bait is taken by a fish, sinker 10 will, in most cases, be taken into the mouth of the fish along with the baited hook. As the fisherman exerts pressure on the fishing line to set the hook, sinker 10 will generally be withdrawn from the closed jaws of the fish. Regardless of the initial position of the preferred embodiment of sinker 10 relative to the mouth of the fish when first taken therein, as the mouth of the fish is closed and sinker 10 is withdrawn therefrom, the flattened shape of sinker 10 will cause body 12 to function as a cam, forcing the plane of body 12 into alignment with the plane of the jaws of the fish, thus placing the plane of curvature of the fishing hook perpendicular to the plane of the jaws of the fish and maximizing the probability of penetration of the point of the fishing hook into the body of the fish. It will be readily understood that the above-described cam action will be achieved with use of the preferred, flattened, embodiment of sinker 10 whether used alone or with alternative spinner form 30, and it will be further understood, as noted above, that the described cam action is not achieved with use of the alternative embodiment of sinker 10 in which body 12 is radially symmetrical.

When the hooked fish begins to fight the hook and pressure of the fishing line, typically throwing its head from side to side, the frictionally retained interconnection between the fishing hook and sinker 10 will be released, and sinker 10 will freely slide along the fishing line away from the fishing hook. Such release of sinker 10 eliminates the leverage and momentum associated with a sinker firmly interconnected to the fishing line in proximity to the hook or integral with the hook, and substantially reduces the probability that the fish will successfully throw the hook from its mouth. The release of sinker 10 from the fishing hook is achieved with the disclosed alternative embodiments to the same extent and with the same advantageous results as with the preferred embodiment.

The foregoing detailed description of the preferred embodiment of the invention and of certain alternative embodiments of the invention is intended to be illustrative and not limiting. The device of the invention is susceptible to various adaptations and modifications beyond those described without departing from the scope and spirit of the invention as claimed.

What is claimed is:

1. A cam action sliding fishing sinker device comprising:
   an elongate substantially planar body having first and second ends and being of substantially greater width than thickness, said body narrowing in width from its maximum width to a point at said first end and increasing in thickness from said first end toward said second end;
   a slot-like aperture extending into the interior of said body from the second end thereof in coaxial alignment with said body and lying generally in the same plane as said body;
   an elongate aperture penetrating said body along its longitudinal axis from said first and of said body through the interior thereof to said second end, and connecting with said slot-like aperture in coaxial alignment therewith to form a continuous passageway through said body;
   a hollow insert of resilient material disposed within said slot-like aperture and firmly interconnected to said body within said slot-like aperture, the end of said insert at the inner end of said slot-like aperture being penetrated by an aperture in coaxial alignment with said elongate aperture to receive fishing line therethrough, and the end of said insert at the outer end of said slot-like aperture being open to receive the eye and a portion of the shaft of a fishing hook to be inserted therein.

2. The fishing sinker device of claim 1, wherein the height of said thin-walled insert is less than the largest cross-sectional dimension of the eye and shaft of the fishing hook to be received therein.

3. The fishing sinker device of claim 1, wherein said body is formed of a readily maleable metallic material.

4. The fishing sinker device of claim 1, wherein said body is formed of lead or a soft lead alloy.

5. The fishing sinker device of claim 1, wherein said body is formed of a non-metallic material.

6. The fishing sinker device of claim 1, wherein the cross-sectional configuration of said elongate aperture is smoothly rounded to prevent abrasion of the fishing line to be received therethrough, and the least cross-sectional dimension of said elongate aperture is sufficiently greater than the cross-sectional diameter of the fishing line to be received therethrough to allow said fishing line to freely slide through said elongate aperture.

7. The fishing sinker device of claim 1, further comprising a fringed skirt attached to said body intermediate its first and second ends.

8. The fishing sinker device of claim 1, further comprising a spinner bait lure form interconnected to said body at said first end thereof.

9. The fishing sinker device of claim 8, wherein said spinner bait lure form comprises an elongate wire, with first and second ends, formed in a V-shaped configuration, interconnected to said body at said first end of said wire, having a spinner tab interconnected to said second end of said wire so as to allow said spinner tab to move freely about said second end of said wire, and having an eye formed intermediate said first and second ends of said wire to receive fishing line therethrough.

10. The fishing sinker device of claim 9, wherein said eye is disposed in said wire at the point formed by said V-shaped configuration with the plane of said eye perpendicular to the plane defined by said V-shaped configuration of said wire.

11. A fishing sinker device comprising
an elongate body having a longitudinal axis and first and second ends, said body qradually increasing in cross-sectional dimension from a joint at the first end thereof toward the second end thereof;
a hook aperture extending into the interior of said body from the second end thereof in coaxial alignment with the longitudinal axis of said body;
an elongate aperture penetrating said body along the longitudinal axis thereof from said first end of said body to said second end, connecting with said hook aperture in coaxial alignment therewith to form a continuous passageway through said body to receive a fishing line therethrough; and
a resilient insert disposed within said hook aperture and firmly interconnected to said body within said hook aperture, said insert having a hook-retaining aperture extending into the interior thereof from the end of said insert nearest the second end of said body and penetrating said insert to connect with said elongate aperture in coaxial alignment therewith.

12. The fishing sinker device of claim 11, further comprising an elongate, thin-bodied, V-shaped spinner bait lure form with first and second ends, having a spinner tab loosely interconnected to the first end of said form and having an eye to receive fishing line therethrough formed intermediate said first and second ends of said form, said form being interconnected at its second end to said first end of said body of the sinker device.

13. The fishing sinker device of claim 12, further comprising a fringed skirt interconnected to said body intermediate its first and second ends.

14. The fishing sinker device of claim 11, further comprising a fringed skirt interconnected to said body intermediate its first and second ends, with the fringe of said skirt being of sufficient length to extend past said second end of said body a distance greater than the distance of extension of a fishing hook from said second end of said body with the eye of said fishing hook received wIthin said hook-retaining aperture of said resilient insert.

15. A spinner bait lure comprising
an elongate narrow body, with first and second ends, formed in a curved configuration in a single plane;
an eye disposed in said elongate narrow body, to receive a fishing line therethrough, with said eye lying in a plane perpendicular to the plane defined by the curvature of said elongate narrow body;
a spinner tab interconnected to the first end of said elongate narrow body by means of a swivel connector such that said spinner tab is free to spin about an axis contained within the plane defined by the curvature of said elongate narrow body; and
an elongate sinker of substantially greater mass than the combined mass of said elongate narrow body, having first and second ends, said sinker being interconnected at or near its first end to the second end of sáid elongate narrow body with the longitudinal axis of said sinker in the plane defined by the curvature of said elongate narrow body, said sinker being penetrated by a longitudinal aperture extending through said sinker along its longitudinal axis, and said sinker having a hook aperture extending into the interior of said sinker from the second end thereof in coaxial alignment with said longitudinal aperture, adapted to receive and releaseably frictionally retain the eye and a portion of the shaft of a fishing hook to be inserted therein.

16. The spinner bait lure of claim 15, wherein said sinker is formed in the shape of a flattened wedge of greater width than thickness through a majority of its length, with such width being perpendicular to the plane defined by the curvature of said elongate narrow body, narrowing to a point at said first end of said sinker, and wherein said hook aperture is a slot-like aperture havIng a width greater than and a height less than the largest dimension of the eye of the fishing hook to be received therein and disposed such that the plane of such fishing hook is parallel to the plane defined by the curvature of said elongate narrow body with the eye of such fishing hook received in said hook aperture.

17. The spinner bait lure of claim 16, wherein said sinker further includes a fringed skirt interconnected around said sinker with the fringe of said skirt being of sufficient length to extend beyond the end of a fishing hook with the eye of said fishing hook inserted into said hook aperture.

18. The spinner bait lure of claim 15, wherein said hook aperture of said sinker is of sufficient dimension to receive the eye of a fishing hook to be used with the spinner bait lure, and wherein said sinker further includes a resilient insert disposed within said hook aperture and firmly interconnected to said sinker, said resilient insert being penetrated by an insert aperture in coaxial alignment with the elongate aperture of said sinker, to receive and releaseably frictionally retain the eye of a fishing hook inserted therein.

19. In a fishing sinker device for use in conjunction with a fishing hook with a shank portion adapted to be secured at one end thereof to a fishing line, the fishing sinker device having a body including a line aperture extending through the body to form a continuous passageway to receive a fishing line therethrough in sliding relation therewith, the improvement comprising:
a hook aperture extending into the interior of the body and connecting with the line aperture extending through the body so as to form a part of the continuous passageway through the body;
a resilient insert disposed within said hook aperture and having a hook retaining aperture extending into the interior of said insert and penetrating said insert to connect with the line aperture extending through the body of the fishing sinker device, with said hook retaining aperture of said insert adapted to receive and frictionally releasably retain said end of said shank portion of the fishing hook within said hook retaining aperture.

* * * * *